C. S. BRADLEY.
PRODUCTION OF CARBON.
APPLICATION FILED AUG. 30, 1917.
1,396,018.
Patented Nov. 8, 1921.
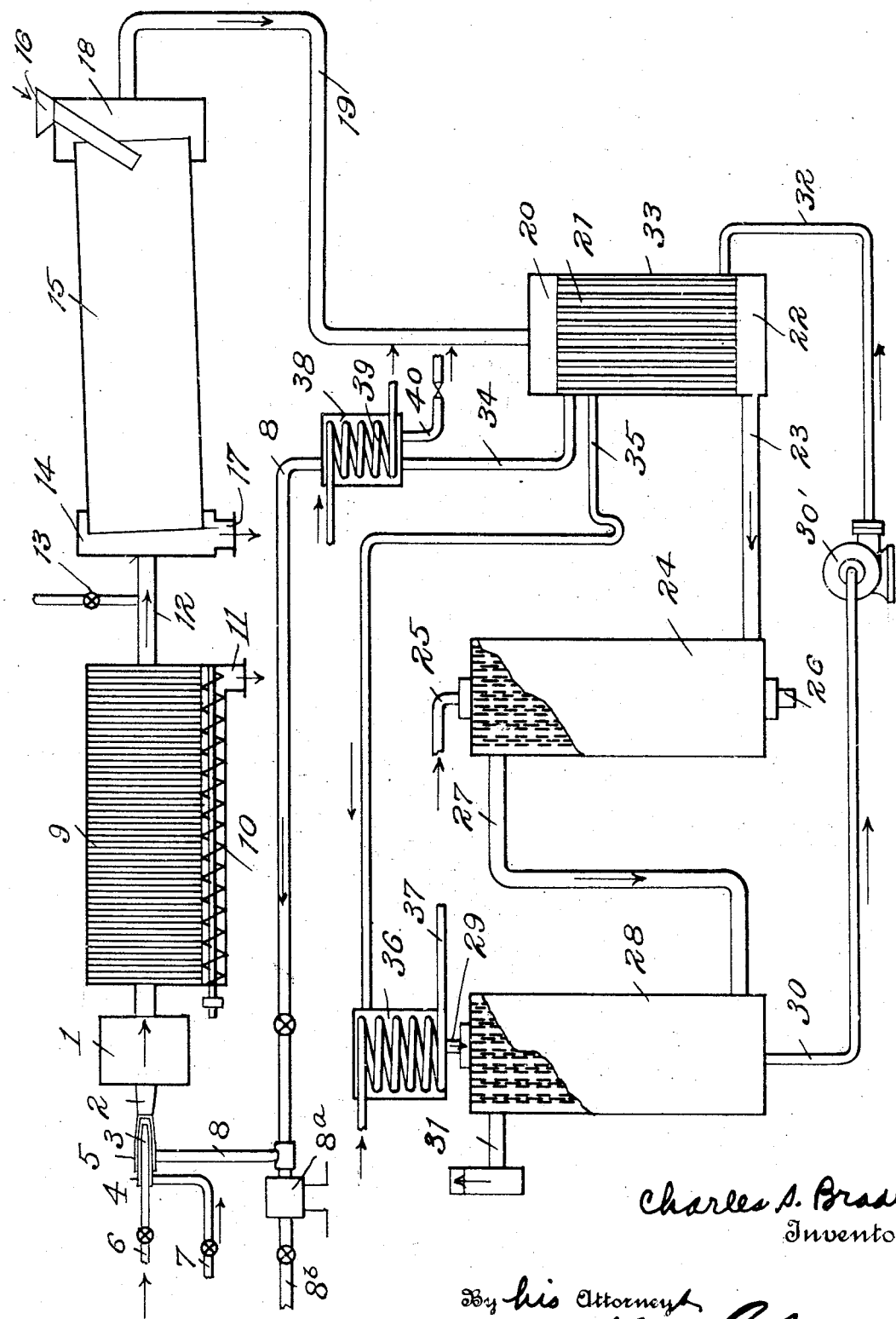
Charles S. Bradley
Inventor
By his Attorney
Knight Bros

UNITED STATES PATENT OFFICE.

CHARLES S. BRADLEY, OF NEW YORK, N. Y.

PRODUCTION OF CARBON.

1,396,018. Specification of Letters Patent. Patented Nov. 8, 1921.

Application filed August 30, 1917. Serial No. 188,947.

*To all whom it may concern:*

Be it known that I, CHARLES S. BRADLEY, a citizen of the United States, residing in Manhattan, city, county, and State of New York, have invented certain Improvements in the Production of Carbon, of which the following is a specification.

The present invention relates to the commercial production of carbon or lampblack. The object of the invention is primarily to produce carbon economically from a carbon compound by direct chemical action.

In producing carbon from its compounds, by direct chemical action, the efficiency will depend upon the maintenance of a prescribed temperature and the proper chemical balance, uniformly and homogeneously throughout the entire mass of the material taking part in the chemical action. This temperature should be high enough to reach the point at which the carbon is thrown out of combination, but not high enough to permit the freed carbon to be consumed. The chemical balance or vapor tensions may be satisfied by the presence of a gaseous carbon compound, such as carbon monoxid.

The use of local heating or cooling devices acting only at the surface of the reaction chamber is objectionable as not maintaining the temperature conditions uniformly and homogeneously throughout the entire mass of reaction material. Likewise the introduction of extraneous carbon compounds for making up the chemical balance would ordinarily be very difficult to properly regulate so as to maintain uniformity throughout the entire mass.

According to my invention, the desired uniformity of temperature and chemical balance are secured by applying the necessary regulation to the substances and thoroughly mixing them together prior to their introduction into the reaction chamber. In this way, the regulating influence, whether it be of temperature production or chemical balance, is effective uniformly and homogeneously throughout the entire mass during the chemical reaction. This fundamental principle of the invention may be embodied in various ways. For example, a carbon compound may be acted upon by a reagent which acts endothermically, setting free carbon from the said compound and producing carbon monoxid. In such a case, the temperature of reaction requires introduction of heat from an outside source and according to this invention, such heat is introduced into the system by applying it to one or both of the ingredients, prior to their being commingled and introduced into the reaction chamber. The same principles may be involved for example, in the use of an exothermic reagent, necessitating artificial cooling means. In that case, the cooling is effected by withdrawing heat from one or both of the ingredients prior to their being commingled and introduced into the reaction chamber. The invention may furthermore be embodied in a system in which a carbon compound is acted upon conjointly by one reagent acting endothermically and another reagent acting exothermically, in which event the temperature is maintained uniform by proper regulation of the proportionate supplies of the several ingredients.

The principles of the invention are perhaps best illustrated in the production of carbon from hydrogen compounds by reacting upon compounds such as methane, ethane, propane, butane, etc., with substances which combine with the hydrogen in both endothermic and exothermic reactions, leaving the carbon free, while at the same time maintaining the proper chemical balance to avoid consumption of the free carbon. I shall, therefore, describe in detail an embodiment of the invention in which the substance methane is acted upon by carbon dioxid and oxygen. In order that such an embodiment may be clearly understood, reference is made to the accompanying drawing. Said drawing shows in diagram, a system for the production of carbon from methane, carbon dioxid and air, in which provision is made for the regeneration of the carbon dioxid.

It will be understood that other hydrogen compounds of carbon might be employed under the same principles of operation and that the oxygen referred to may be either in the form of atmospheric air or in the form of more or less pure oxygen.

Referring more specifically to said drawing, 1 indicates a reaction or combustion chamber into which a mixture of methane, carbon dioxid and air is introduced by the nozzle 2, which contains three coaxially arranged supply pipes or tubes 3, 4 and 5, corresponding with the supply pipes 6, 7 and 8. These supply pipes 6, 7 and 8 furnish methane, air and carbon dioxid respectively, pipe 6 delivering the methane into the central tube 3, from which it issues in the form of a jet. This jet draws in the air and carbon dioxid in a manner which will be apparent. The three substances are in this way thoroughly mixed and upon being ignited will react together uniformly throughout the entire mass as follows:

(1) $CH_4 + 2CO_2 = C + 2CO + 2H_2O$
(2) $CH_4 + 2O = C + 2H_2O$

In the above reactions, the chemical heat units may be represented as follows:

$CH_4 = -21,750$
$2CO_2 = -193,920$
$\phantom{2CO_2 = }-215,670$
$\phantom{2CO_2 = \ }174,000$
$\phantom{2CO_2 = }-41,670$ endothermic (1)

$CH_4 = 21,750$
$2CO = 58,000$
$2H_2O = 116,000$
$\phantom{2H_2O = }174,000$ $2H_2O = 116,000$
$\phantom{2H_2O = \ }21,750$
$\phantom{2H_2O = \ }94,250$ exothermic (2)
$\phantom{2H_2O = \ }41,670$ endothermic (1)

$\phantom{2H_2O = \ }52,580$ exothermic balance at proportions given.

The reaction between the carbon dioxid and the methane is an endothermic chemical action, whereas that between the oxygen and the methane is an exothermic chemical action. Due to the intimate mixture of the substances, the temperature and composition will be substantially uniform throughout. By suitably adjusting the proportionate supplies of carbon dioxid and oxygen, the temperature of the reaction may be either raised or lowered. In practice, the supplies of the respective substances may, if desired, be adjusted according to the amount of free carbon which is being obtained, as there will obviously be a critical temperature representing the maximum hydrogen consumption and minimum consumption of the freed carbon. If it is desired to control the temperature automatically, I may employ, for example, any approved type of thermostatic device in the chamber 1, which is operatively connected in known manner to valves in one or more of the pipes 6, 7 and 8 to effect the desired variation in the proportionate supply of the respective substances. Just what this temperature is, will of course depend upon the particular substances which are to be acted upon, but in the case of methane, carbon dioxid and oxygen, we may assume, for example, that the temperature is approximately 650° centigrade.

The above reaction, it will be seen, produces carbon monoxid and water in addition to the free carbon, so that the chemical balance which reduces the tendency of the freed carbon to be consumed, is provided for. The more carbon monoxid there is present, the greater the yield of carbon, according to the laws for the reaction of gases at high temperature.

The carbon monoxid and water, together with the free carbon, pass from the reaction chamber 1 in to a collector 9 for the removal of the carbon. This collector may be of any approved type and is shown diagrammatically as following the general construction employed in dust catchers. The particles of free carbon settled to the bottom and are delivered by means of a worm 10 through the discharge orifice 11.

The carbon dioxid and water from which the carbon product has been removed in collector 9 will, of course, be in gaseous form at the existing temperature and are discharged from the collector through the pipe 12. It will be apparent that so far as the production of carbon itself is directly concerned, the process might be regarded as complete at this point, the gaseous products which still remain being abandoned. In that event, however, the entire supply of carbon dioxid for the endothermic chemical action upon the material, would have to be made up from an outside source. The carbon-monoxid on the other hand, may readily be oxidized to regenerate the carbon dioxid, especially as it is already at a sufficiently high temperature to react directly with atmospheric oxygen. It will be observed that theoretically the same quantity of carbon monoxid could be maintained in the system by simple reoxidation, in this way, and it would only be necessary to make up, from an outside source, the unavoidable loss which occurs in practice. For the sake of economy, I prefer to embody as a part of the complete system a regenerating element wherein the carbon monoxid coming from the collector 9 is reoxidized and any loss is made up. The temperature at which the gases come from the collector 9 is, as above stated, within the zone at which carbon monoxid will ignite directly with atmospheric oxygen without the necessity of introducing heat from an outside source. It is also to be noted that this temperature is, in the example given, approximately within the temperature range in which carbon dioxid can be driven off from limestone. By the addition of oxygen, either pure or in atmospheric form, the temperature can, if necessary, be elevated to the proper degree for burning limestone, while the available carbon monoxid is being oxidized to carbon dioxid.

In order to carry out the regenerating process above indicated, the system may comprise, for example, an air pipe 13 leading into the pipe 12, by which the carbon monoxid is oxidized up to carbon dioxid and the temperature of the gases raised to a point at which carbon dioxid is driven off from limestone. These gases having been thus heated and acted upon are then delivered into the entrance head 14 of rotary lime kiln 15. The limestone is introduced into the collector by way of hopper 16 and in passing through the drum is converted into burnt lime which is discharged through the outlet 17. The burning of the limestone within the collector 15 introduces a further quantity of carbon dioxid into the gaseous mixture of carbon dioxid, water and nitrogen which enter the kiln. The resultant mixture with the carbon dioxid thus increased, pass out through the exit head 18 and through pipe 19 into the receiving header 20 of an interchanger or boiler, where a portion of its heat is employed for a purpose to be described later. The gaseous mixture of carbon dioxid, nitrogen and water passes through the tubes 21 of the interchanger or boiler and is delivered through the discharge header 22 into a passage 23 which leads to the tower 24, wherein the gaseous mixture is further cooled and the steam condensed. This tower is supplied with a water supply pipe 25 and a waste pipe 26, the cooling water passing through the tower in opposite direction to the gases, which latter now freed from excess water and in the form of a relatively cool mixture of carbon dioxid and nitrogen, are discharged into a pipe 27.

Having thus removed the excess water from the gaseous mixture, it then remains to get rid of the nitrogen. For this purpose I may, for example, employ an absorption tower 28, in which the gaseous mixture is subject to a solution which will absorb the carbon dioxid but permit the nitrogen to pass through. The removal of excess water above referred to prevents continuous dilution of the absorbing solution. Sodium carbonate or potassium carbonate may be employed for this purpose. The absorption involves the formation of a bicarbonate from the normal carbonate solution and carbon dioxid. In the case of the sodium salt, the bicarbonate is less soluble so that larger quantities or more dilute solutions would have to be employed or provision would be required for taking care of the precipitate in case of super-saturated solutions. While I might prefer in practice to use the sodium salt, which is cheaper, the principle of operation, so far as the present invention is concerned is the same in either case and the description and illustration of the same is simpler when assuming the use of the potassium salt which therefore I shall describe. The reaction involves the question of temperatures, the bicarbonate being formed at normal temperatures from the action between the normal carbonate and the carbonic acid gas, while at higher temperatures the carbonic acid gas is driven off leaving the normal carbonate.

$$Na_2CO_3 + H_2O + CO_2 = 2NaHCO_3$$
$$K_2CO_3 + H_2O + CO_2 = 2KHCO_3$$
$$2NaHCO_3 + heat = Na_2CO_3 + CO_2 + H_2O$$
$$2KHCO_3 + heat = K_2CO_3 + CO_2 + H_2O$$

The mixture of carbon dioxid and nitrogen enters the absorption tower 28 after having been cooled in its passage through the tower 24 and may, for example, be maintained at a temperature around 35° C. Potassium carbonate solution of suitable strength is introduced into the tower 28 through pipe 29 and passes through the tower in the opposite direction to the gaseous mixture, so that the bicarbonate of potassium comes from the tower through pipe 30, whereas the nitrogen is discharged from the tower through the waste pipe 31. With regard to the strength of solution employed, it will be understood by those skilled in this art, that potassium bicarbonate, being soluble at the temperatures referred to, in about the proportion of 125 parts bicarbonate to 100 parts of water, the strength and quantity of solution will be readily figured to meet the requirements of the quantity of carbon dioxid which is to be absorbed. The bicarbonate solution is withdrawn through pipe 30 under the influence of a pump 30' which delivers the solution through pipe 32 into the chamber 33 surrounding the tubes 21 of the changer or boiler above referred to. While passing around the tubes 21, the bicarbonate solution is heated to about 105° C. by the hot gaseous mixture of carbon dioxid, nitrogen and water coming from the lime kiln 15, so that carbon dioxid is driven off from the bicarbonate through the pipe 34, while the normal solution of potassium carbonate flows through return pipe 35 into the cooling chamber 36, where it is cooled by coil 37 through which cooling water is permitted to flow. In this way, the normal carbonate is again lowered to the temperature at which the carbon dioxid will be absorbed. The carbon dioxid which has been driven off from the solution through pipe 34 is mixed with water vapor, due to the fact that the temperature in the interchanger or boiler is maintained preferably at a little above the boiling point of water. To remove this water, the carbon dioxid is discharged from pipe 34 into a chamber 38 containing a coil 39 through which cooling water passes. The water vapor is thereby condensed and discharged through pipe 40, the dry carbon dioxid gas being delivered from that point through pipe 8 into the tube 5 of nozzle 2 for the purpose of taking part in the reaction with material as already above described.

It is obvious that the described process and apparatus for removing water and nitrogen might be employed even where the burning of lime is dispensed with, if the carbon monoxid is to be treated for regenerating the carbon dioxid.

To illustrate an embodiment of the invention in which the temperature is maintained by a temperature change applied to one of the ingredients prior to their being mixed together and introduced into the reaction chamber, I may refer to the treatment of for example, methane with carbon dioxid, as follows:

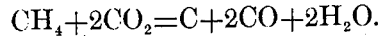

$$CH_4 + 2CO_2 = C + 2CO + 2H_2O.$$

The action between the methane and carbon dioxid is endothermic and to maintain the temperature uniformly and homogeneously at the proper degree, the carbon dioxid may be preheated to the temperature necessary to maintain the desired temperature of reaction, as indicated diagrammatically by the preheater $8^a$ in the substitute carbon dioxid pipe $8^b$.

I claim:—

1. The method of producing carbon, which comprises treating a carbon compound with substances which react endothermically and exothermically to set free the carbon and regulating the ratio of endothermically acting to exothermically acting substances to maintain the temperature within the proper range, while at the same time maintaining a gaseous carbon compound present to restrain oxidation of the freed carbon.

2. The method of producing carbon which comprises acting upon a suitable carbon and hydrogen compound with carbon dioxid and oxygen at a temperature maintained by the chemical action, setting free carbon from the carbon and hydrogen compound and producing a gaseous mixture containing carbon monoxid, separating the free carbon from the gaseous mixture, and exposing the remaining gases, still in heated condition, from the chemical action, to oxygen for regenerating the carbon dioxid.

3. The method of producing carbon which comprises setting free the carbon of a suitable compound by reaction with carbon dioxid and oxygen acting conjointly and in regulated proportions to maintain the temperature within the required range.

4. The method of producing carbon which comprises setting free the carbon of a suitable compound of carbon and hydrogen by reaction with carbon dioxid and atmospheric oxygen acting conjointly and in proper proportions to maintain the temperature within the required range, regenerating carbon dioxid from the resultant carbon monoxid mixed with nitrogen and water, isolating the regenerated carbon dioxid and returning it to the original raction.

5. The method of producing carbon which comprises setting free the carbon of a suitable compound, by reaction with carbon dioxid and oxygen, with formation of carbon monoxid, separting the carbon from the other products of the reaction, burning the carbon monoxid to regenerate carbon dioxid, and commingling the regenerated carbon dioxid thus secured with further quantities of oxygen and a carbon compound for setting free further quantities of carbon in cyclic manner.

CHARLES S. BRADLEY.